US007246639B2

United States Patent
Kuntz

(10) Patent No.: US 7,246,639 B2
(45) Date of Patent: Jul. 24, 2007

(54) SUSPENDED CONTAINMENT SYSTEM

(75) Inventor: James P. Kuntz, Spokane, WA (US)

(73) Assignee: Spokane Industries, Inc., Spokane, WA (US)

( * ) Notice: Subject to any disclaimer, the term of this patent is extended or adjusted under 35 U.S.C. 154(b) by 64 days.

(21) Appl. No.: 11/167,362

(22) Filed: Jun. 27, 2005

(65) Prior Publication Data

US 2007/0000557 A1    Jan. 4, 2007

(51) Int. Cl.
   *B65B 1/04* (2006.01)
(52) U.S. Cl. .................. 141/86; 141/65; 141/311 A; 141/98; 141/334; 141/337; 184/1.5; 184/104
(58) Field of Classification Search .............. 141/65, 141/98, 331–339, 86–88, 311 A; 220/571–573; 184/104, 1.5
   See application file for complete search history.

(56) References Cited

U.S. PATENT DOCUMENTS 5,117,876 A * 6/1992 Kuntz .................. 141/7
5,803,140 A * 9/1998 Jodoin .................. 141/332
5,878,799 A * 3/1999 Hannick ................ 141/351
5,979,516 A * 11/1999 Grant ................... 141/331
6,860,300 B1 * 3/2005 Kuntz .................... 141/65

* cited by examiner

*Primary Examiner*—Steven O. Douglas
(74) *Attorney, Agent, or Firm*—Holland & Hart LLP

(57) ABSTRACT

The present invention provides methods and apparatus for containing aircraft fuel. According to some embodiments the apparatus includes a structural connector comprising an open shape, a first surface and a second surface, a seal defining a suction area disposed in the first surface, and a boot extending from the structural connector. The boot may comprise a lateral opening. The boot includes first and second ends, such that the first end of the boot may be attached to the structural connector and the second end may be spaced from the structural member. According to some embodiments the second end comprises a center offset laterally from the center of the structural connector.

10 Claims, 3 Drawing Sheets

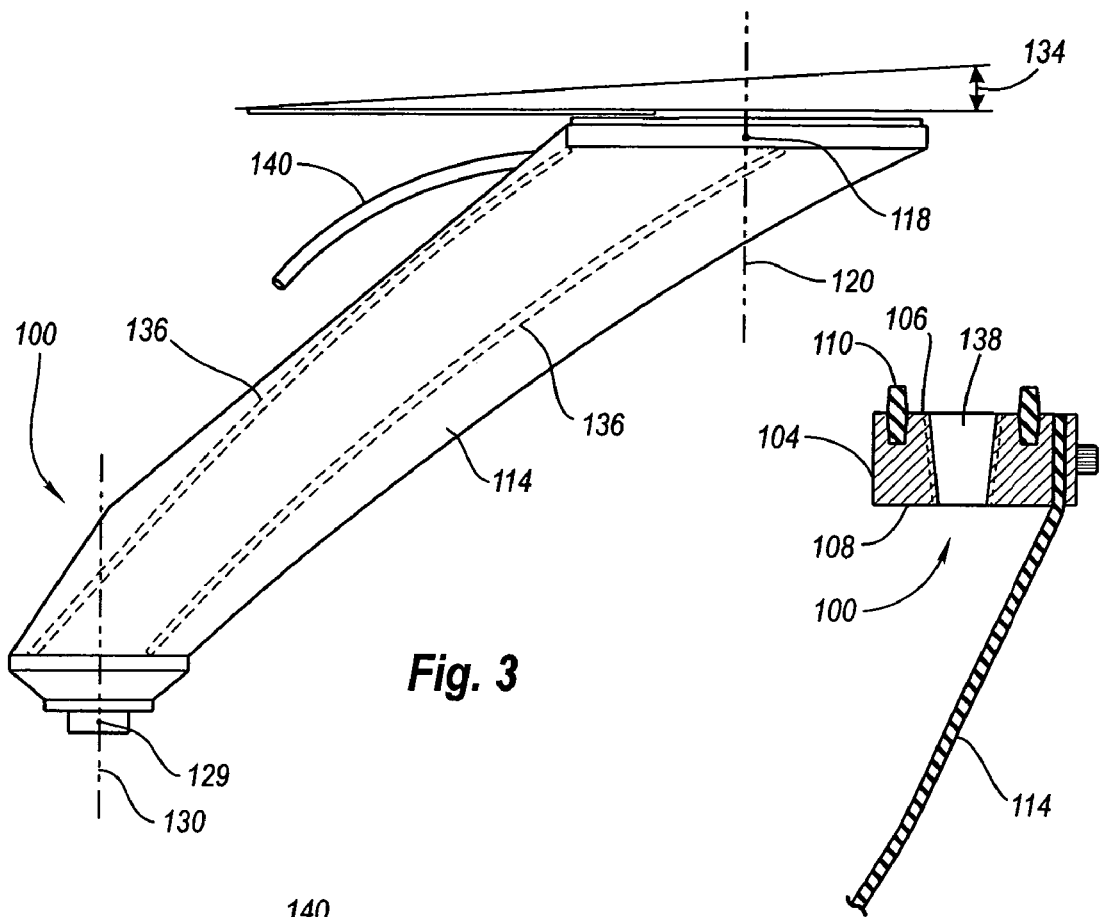
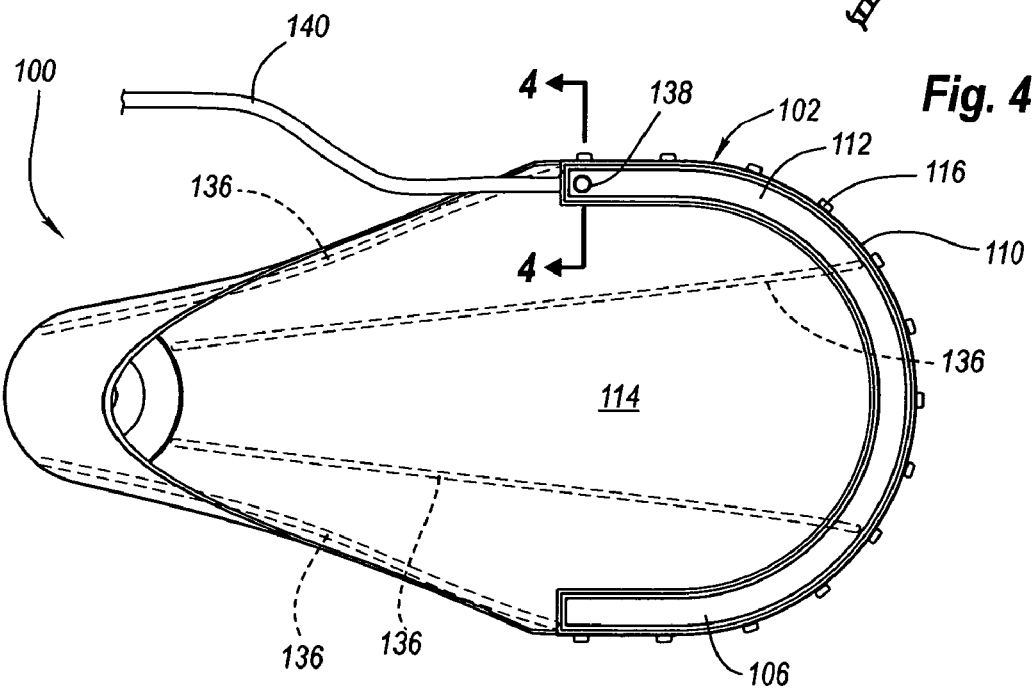

SUSPENDED CONTAINMENT SYSTEM

FIELD OF THE INVENTION

The present invention relates to aircraft equipment, and more particularly to an aircraft defueling system.

BACKGROUND OF THE INVENTION

One of the most commonly recognized difficulties associated with airplanes and other aircraft is fueling and defueling. Jet fuel, for example, is a flammable hydrocarbon liquid that can be ignited even in certain ambient conditions, primarily based on temperature and vapor concentration. The temperature at which the vapors of a flammable liquid can ignite is known as the "flash point." A hazardous vapor concentration is present when a fuel vapor reaches a level known as the lower flammability limit (LFL) or lower explosive limit (LEL). These limits are usually expressed as a percentage by volume. Fuels below the LFL/LEL are considered too lean to burn. If the fuel vapor concentration exceeds the upper flammability limit or upper explosive limit, the fuel is considered too rich to burn. A fuel vapor concentration between these two limits is considered to be in its flammable range and will ignite and burn if exposed to an ignition source.

In addition, hydrocarbons, including jet fuel, may also present toxic or irritant hazards. Jet fuel and other hydrocarbons can affect the nervous system, causing headache, dizziness, and lack of coordination. Exposure to some hydrocarbons may also cause skin irritations if not controlled. Therefore, it is highly desirable to prevent or minimize human contact with fuel when fuelling or defueling an airplane.

Further, defueling an aircraft is a common occurrence. It is often desirable to defuel an aircraft before taking it out of service for maintenance or repair. Aircraft typically include one or more fuel drain valves to facilitate the defueling process. The drain valves can be attached to hoses to contain the draining fuel. Nevertheless, even after the majority of the fuel is drained through the drain valves, a significant amount of fuel often remains in the tank due to internal obstructions, low spots, and other phenomenon. Accordingly, sometimes tank access ports that may, for example, provide access to fuel pumps and other internal components, may be adjacent to pools of fuel even after defueling operations. In large aircraft, opening a tank access port following a defueling operation can still release tens to hundreds of gallons of fuel. Therefore, there is a need for an aircraft fuel containment system that minimizes the risk of contact with the fuel and fuel leaks as tank access ports are opened.

SUMMARY OF THE INVENTION

The present invention provides methods and apparatus for containing fuel from an aircraft. According to some embodiments, an aircraft fuel containment apparatus comprises a structural connector and a boot extending from the structural connector. The structural connector comprises an open shape, a first surface and a second surface, and a seal defining a suction area disposed in the first surface. The boot may comprise a lateral opening. The structural connector may also comprise a center, and the boot may comprise a first end and a second end. The first end of the boot is attached to the structural connector and the second end is spaced from the structural member such that the second end comprises a center offset laterally from the center of the structural connector. The open shape may comprise a general U-shape with a center of mass, and the boot may comprise a partial cone with an apex, wherein the apex is not vertically aligned with a vertical axis passing through the center of mass of the general U-shape. A vacuum port may extend through the structural connector, and a vacuum hose may attach to the vacuum port at the second surface. According to some embodiments, the boot comprises a rubber boot with at least one structural reinforcer. Some embodiments of the boot comprise at least two, three, or four structural reinforcers. The seal may comprise a suction cup trough. The boot may comprise an open first end attached to the structural connecter and a second end comprising a drain hose fitting.

Another aspect of the invention provides an aircraft defueling fitting comprising a funnel, the funnel comprising an open first end having a first central axis, and a second end having a second central axis, the second central axis being spaced from the first central axis. The funnel may comprise a suction connector for attaching the funnel to a surface. The funnel may comprise a U-shaped plate with a circumferential seal, and a vacuum port disposed in the U-shaped plate for connection to a vacuum source. The funnel may comprise an elastomer having at least three reinforcing rods extending from the first to the second ends. The funnel may comprise a lateral opening that is open to the open first end.

Another aspect of the invention provides an apparatus comprising an aircraft fuel containment fitting, the aircraft fuel containment fitting comprising a semi-circular mount, a suction trough disposed in the semi-circular mount, a vacuum port disposed in the semi-circular mount, an elastomeric boot attached to the semi-circular mount, and a hose fitting attached to the elastomeric boot. The semi-circular mount may comprises a center of mass and a first vertical axis extending through the center of mass, and the hose fitting may comprise a second central vertical axis generally parallel to but spaced laterally from the first vertical axis. The elastomeric boot may comprise a general cone shape with a base having a center and an apex spaced laterally from the center of the base. The elastomeric boot may comprise an open first end and a lateral cut in a side that is open to the first end, the lateral cut extending from an apex to first and second ends of the semi-circular mount.

Another aspect of the invention provides a method of removing fuel from an aircraft fuel tank. The method comprises pneumatically attaching a semi-circular mount to an aircraft surface adjacent to a fuel tank access port, the semi-circular mount being attached to a containment boot with an apex offset from a center of a base thereof, opening the fuel drain of the aircraft, trapping fuel from the access port in the containment boot, and funneling the fuel from the containment boot to a collection hose. The pneumatically attaching may comprise applying a vacuum to the semi-circular mount through a vacuum port disposed in the semi-circular mount.

Another aspect of the invention provides an aircraft fuel containment apparatus. The apparatus comprises a structural connector, and the structural connector includes a curved open bar, the curved open bar comprising first and second generally horizontal surfaces, second and third generally vertical surfaces, first and second generally vertical end faces, and an elastomeric seal defining a suction area disposed in the first surface. The apparatus also includes an offset-center collection boot extending from the structural connector.

Other features and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings, in which:

FIG. 3 is a side view of the aircraft fuel containment apparatus of FIG. 1;

FIG. 4 is a cross-sectional view of a structural connector of the aircraft containment apparatus of FIG. 1;

FIG. 5 is a top view of the aircraft containment apparatus of FIG. 1.

Throughout the drawings, identical reference numbers and descriptions indicate similar, but not necessarily identical elements.

DETAILED DESCRIPTION OF THE INVENTION

As mentioned above, it is a common procedure to defuel an aircraft prior to storage, maintenance, or repair. Most aircraft include one or more drain valves spaced along the fuel tanks to facilitate defueling. The drain valves are usually spring loaded "poppet" valves that are opened by the application of a force normal to the spring force. However, many aircraft fuel tanks have low or recessed areas, baffles, or other fluid flow impediments that result in pools of fuel even after a defueling operation via the drain valves. Some of these pools of fuel are coincident to fuel tank access ports. For example, a KC-135 includes an oval-shaped wing panel (held in place by a ring of counter sunk screws) that provides access to fuel pumps and other equipment that may require periodic maintenance and repair. The oval-shaped panel of the KC-135 is located in the bottom of the wing, and a considerable amount if fuel is often trapped at the access port location, even after normal defueling operations. In fact, tens to hundreds of gallons may remain in the wing of a KC-135 after a normal defueling operation. The trapped fuel tends to spill when the oval port is opened. Further, even if an open tank is placed below the oval-shaped panel to catch some of the leaking fuel, much of the fuel tends to run along the wings and toward the fuselage, where it spills to the ground.

Therefore, the present invention is directed to aircraft fuel containment apparatus and associated methods of defueling, including features that reduce the risk of spills or leaks. More specifically, the present invention provides methods and apparatus that may utilize a containment boot to collect fuel remaining in an aircraft tank when, for example, certain access ports (which may include drains) are opened. The methods and apparatus described herein can be used in combination with any aircraft, including without limitation fixed wing aircraft (airplanes) and rotary wing aircraft (helicopters). Such aircraft are normally provided with one or more fuel tank access ports mounted at the wings and/or the fuselage.

As used throughout the specification and claims, the term "suction cup" is used broadly to mean any device designed to adhere to a surface by means of suction or a vacuum. "Funnel" is also used broadly to mean a device having a hole or narrow passage at an apex and used to channel the flow of a substance. "Semi-circular" means any open, curved segment. "Vacuum" means lower pressure than local atmospheric pressure. The words "including" and "having," as used in the specification, including the claims, have the same meaning as the word "comprising."

Figure 1:
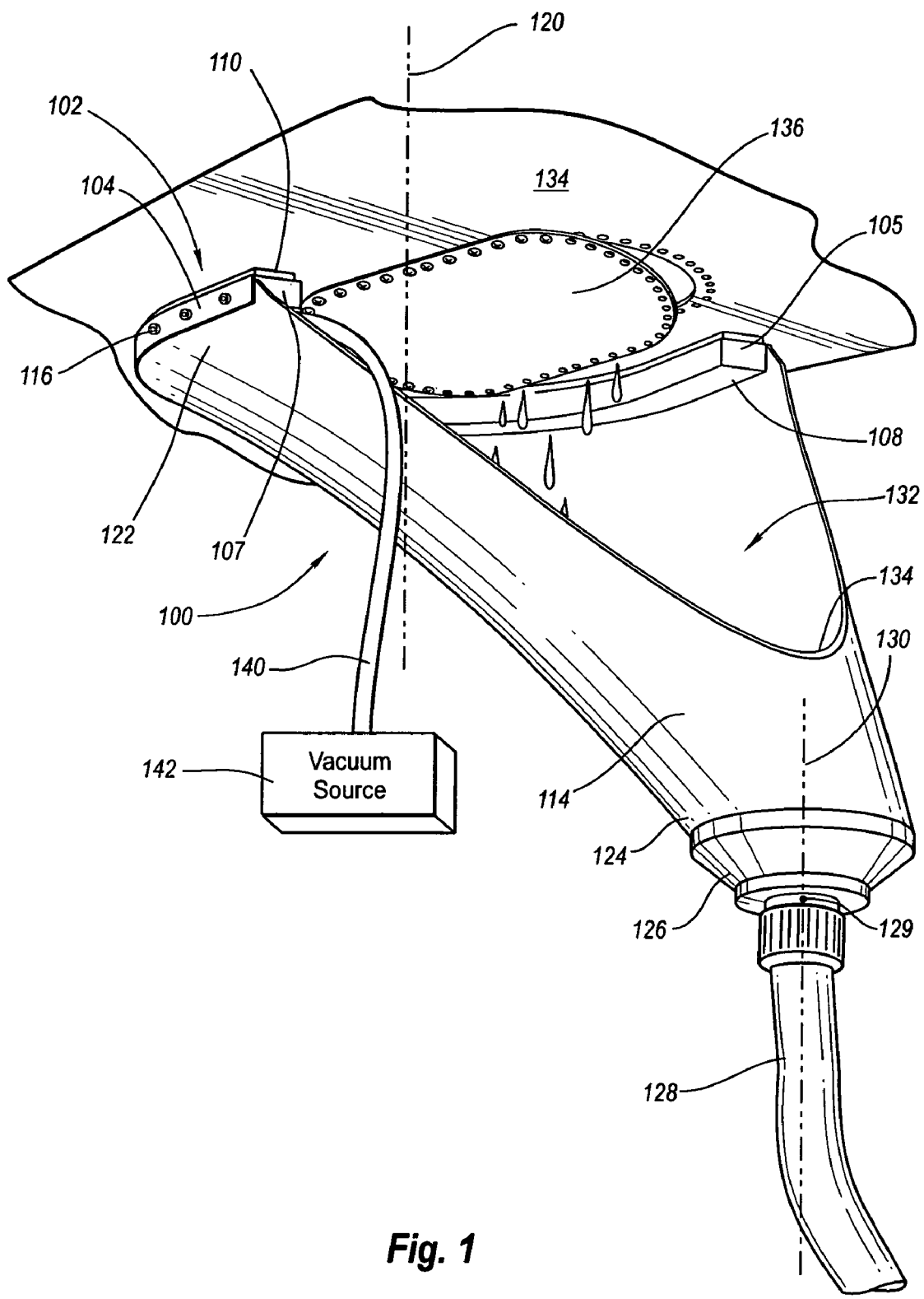
FIG. 1 is a bottom perspective view of an aircraft fuel containment apparatus in relation to an aircraft according to one embodiment of the present invention.
Figure 2:
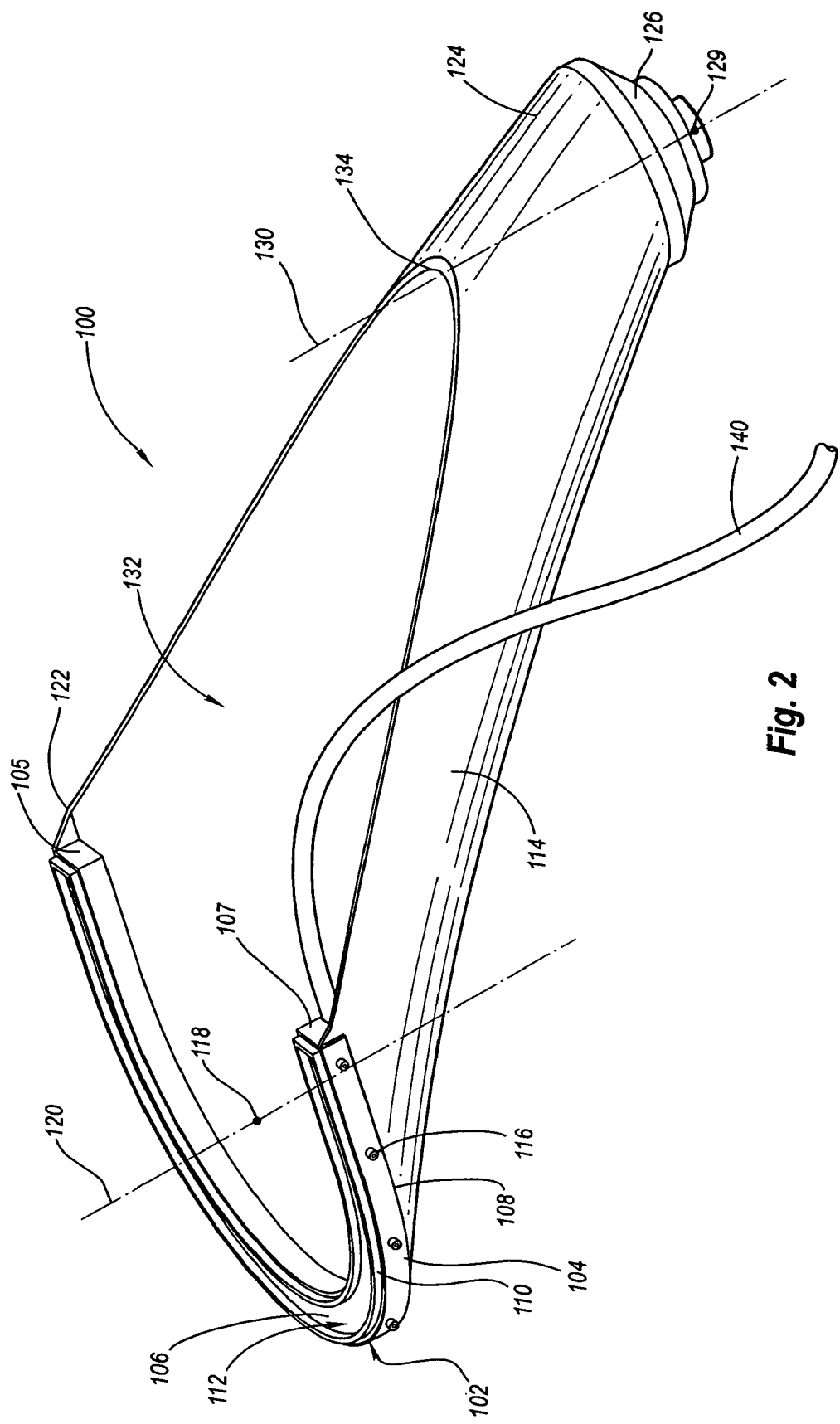
FIG. 2 is a top perspective view of the aircraft fuel containment apparatus of FIG. 1.

Turning now to the figures, and in particular to FIGS. 1-5, an aircraft fuel containment apparatus, which may be a defueling fitting 100, is shown according to one embodiment of the present invention. The aircraft defueling fitting 100 comprises a structural connector such as suction connector or suction cup 102. The suction cup 102 may comprise a mount 104 made of aluminum or other materials and may be arranged in an open shape. According to the embodiment of FIGS. 1-5, the open shape of the mount 104 is a general U-shape or a semi-circular shape. However, any other open shape may also be used, as may a closed shape. The mount 104 shown in FIGS. 1-5 comprises first and second ends 105, 107, and a center 118 (FIG. 2). The center 118 may be a center of mass for the mount 104 or a geometric center. A generally vertical central axis 120 of the mount passing through the center 118 is shown in FIGS. 1-3. The mount 104 also includes a first or upper surface 106 and a second or lower surface 108. A seal, for example a suction cup seal 110, is shaped as a curved trough and defines a suction area 112. The suction cup seal 110 may be circumferentially disposed in the upper surface 106 of the mount 104. The suction cup seal 110 may comprise an elastomeric material.

A boot or funnel, such as a generally conical boot 114 shown in FIGS. 1-5, may extend from the mount 104. According to the embodiment of FIGS. 1-5, the conical boot 114 is attached to the mount 104 by a plurality of fasteners, such as screws 116. The conical boot 114 may comprise an elastomer such as rubber or other suitable material that is generally capable of containing fuel or other fluids. The conical boot 114 is attached to the mount 104 at a first end or base 122 and tapers to an apex at a second end or apex 124. The base 122 may comprise a center at the same location as the center 118 of the mount, or the base may have a separate center near or adjacent to the center 118. The second end 124 may comprise a fitting, such as a standard hose attachment fitting 126 shown in FIGS. 1-3. The hose attachment fitting 126 facilitates attachment to a hose 128 (FIG. 1).

As shown in FIGS. 1-5, the conical boot 114 is arranged unlike a typical funnel or cone. The second end or apex 124 of the conical boot 114 also exhibits a center 129. FIGS. 1-3 illustrate a generally vertical central axis 130 passing through the center 129 of the apex 124. However, unlike a traditional cone or funnel, the vertical axis 130 passing through the center 129 of the apex 124 does not coincide with the vertical axis 120 passing through the center 118 of the base 122. The two vertical axes 120, 130 may be generally parallel, but they are offset laterally from one another as shown in FIGS. 1-3. Nevertheless, some embodiments of the boot 114 may be shaped more like a traditional cone or funnel.

The boot 114 may include one or more structural reinforcers according to some embodiments. For example, as shown in FIG. 5, four reinforcing rods 136 may extend longitudinally through the boot 114 at spaced intervals. The reinforcing rods 136 may overlap with, but not attach to, the mount 104. The reinforcing rods 136 support the boot 114 in the shape shown in FIGS. 1-5. According to some embodiments, the reinforcing rods 136 comprise steel or aluminum and are vulcanized to the boot 114.

According to the embodiment of FIGS. 1-5, the boot 114 comprises a lateral opening or cut 132. The lateral opening 132 extends from an apex 134 to the first and second ends 105, 107 of the mount 104. The lateral opening 132 is thus open to the first end 122 of the boot 114 and advantageously provides a larger area or catch basin than a typical cone or funnel. Thus, fuel that empties from an aircraft 134 (FIG. 1) when an access port 136 (FIG. 1) is opened is more likely to be contained. However, the lateral opening 132 is optional.

Referring now to FIGS. 4-5, the mount 104 comprises a vacuum port 138 extending through the mount 104 from the first surface 106 to the second surface 108. The vacuum port 138 is connectable to a vacuum hose 140 at the second surface 108, and the vacuum hose 140 may be in fluid communication with a vacuum source 142 (FIG. 1). The vacuum port 138 enables the mount 104 (and thus the entire defueling apparatus 100) to pneumatically attach to the aircraft 134 (FIG. 1).

Operation of the aircraft defueling apparatus 100 according to one aspect of the present invention is described below with reference to FIG. 1. When the access port 136 of the aircraft 134 is ready to be opened, the defueling apparatus 100 is lifted to the orientation shown in FIG. 1, with the mount 104 around and adjacent to the access port 136. The aircraft defueling fitting 100 is preferably arranged such that the boot 114 is open to, and completely surrounds, the access port 136 (or at least the footprint of the boot 114 fully overlays the footprint of the access port 136). Vacuum suction is provided from the vacuum source 142 to the mount 104 via the vacuum hose 140. The vacuum source 142 reduces the pressure in the suction cup 112 (FIG. 2) relative to atmosphere and structurally connects the defueling apparatus 100 to the aircraft 134. The access port 136 may then be opened without spilling any of the fuel remaining in the tank. Instead, fuel drains from the access port 136 into the boot 114, through the hose 128, and eventually into a storage tank. Moreover, any fuel that tends to run along the wing and toward the fuselage is blocked by the suction cup 102 and is therefore also collected by the boot 114 as it drops.

While this invention has been described with reference to certain specific embodiments and examples, it will be recognized by those skilled in the art that many variations are possible without departing from the scope and spirit of this invention. For example, the embodiments shown and described above include a structural connector to attach the defueling apparatus to an aircraft surface. However, some embodiments may not include a structural connector. According to some embodiments, the boot 114 may be manually held in position prior to accessing the tank to collect any remaining fuel. The invention, as described by the claims, is intended to cover all changes and modifications of the invention which do not depart from the scope of the invention.

The invention claimed is:

1. An aircraft fuel containment apparatus comprising:
a structural connector, the structural connector comprising:
   an open shape comprising a general U-shape with a center of mass;
   a first surface and a second surface;
   a seal defining a suction area disposed in the first surface;
a boot extending from the structural connector, the boot comprising a lateral opening and a partial cone with an apex, wherein the apex is not vertically aligned with a vertical axis passing through the center of mass of the general U-shape.

2. An aircraft fuel containment apparatus comprising:
a structural connector, the structural connector comprising:
   an open shape;
   a first surface and a second surface;
   a seal defining a suction area disposed in the first surface;
a rubber boot with at least two structural rods extending therethrough, the rubber boot extending from the structural connector and comprising a lateral opening.

3. An aircraft defueling fitting comprising:
a funnel comprising:
   an open first end comprising a first central axis;
   a second end comprising a second central axis, the second central axis being spaced from the first central axis
   a U-shaped plate with a circumferential seal;
   a vacuum port disposed in the U-shaped plate for connection to a vacuum source.

4. An aircraft defueling fitting comprising:
a funnel, the funnel comprising:
   an open first end comprising a first central axis;
   a second end comprising a second central axis, the second central axis being spaced from the first central axis;
an elastomer having at least three reinforcing rods extending from the first to the second end.

5. An apparatus, comprising:
an aircraft fuel containment fitting, the aircraft fuel containment fitting comprising:
   a semi-circular mount;
   a suction trough disposed in the semi-circular mount;
   a vacuum port disposed in the semi-circular mount;
   an elastomeric boot attached to the semi-circular mount;
   a hose fitting attached to the elastomeric boot.

6. An apparatus according to claim 5 wherein the semi-circular mount comprises a center of mass and a first vertical axis extending through the center of mass, and the hose fitting comprises a second central vertical axis generally parallel to but spaced laterally from the first vertical axis.

7. An apparatus according to claim 5 wherein the elastomeric boot comprises a general cone shape with a base having a center and an apex spaced laterally from the center of the base.

8. An apparatus according to claim 5 wherein the elastomeric boot comprises an open first end and a lateral cut in a side that is open to the first end, the lateral cut extending from an apex to first and second ends of the semi-circular mount.

9. A method of removing fuel from an aircraft fuel tank, comprising:
pneumatically attaching a semi-circular mount to an aircraft surface adjacent to a fuel tank access port, the semi-circular mount being attached to a containment boot having an apex offset from a center of a base thereof;
opening the fuel tank access port of the aircraft;
trapping fuel from the drain in the containment boot;
funneling the fuel from the containment boot to a collection hose.

10. A method of removing fuel from an aircraft fuel tank according to claim 9 wherein the pneumatically attaching comprises applying a vacuum to the semi-circular mount through a vacuum port disposed in the semi-circular mount.

* * * * *